United States Patent
Bennett et al.

(10) Patent No.: US 6,701,293 B2
(45) Date of Patent: Mar. 2, 2004

(54) COMBINING N-BEST LISTS FROM MULTIPLE SPEECH RECOGNIZERS

(75) Inventors: Steven M. Bennett, Hillsboro, OR (US); Andrew V. Anderson, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 475 days.

(21) Appl. No.: 09/881,296

(22) Filed: Jun. 13, 2001

(65) Prior Publication Data

US 2002/0193991 A1 Dec. 19, 2002

(51) Int. Cl.[7] .............................................. G10L 15/00
(52) U.S. Cl. ................... 704/251; 704/255; 704/246; 704/250
(58) Field of Search ................................. 704/246, 250, 704/251, 255

(56) References Cited

U.S. PATENT DOCUMENTS

| | | | | |
|---|---|---|---|---|
| 5,651,096 A | * | 7/1997 | Pallakoff et al. | 704/275 |
| 5,983,177 A | * | 11/1999 | Wu et al. | 704/244 |
| 6,377,922 B2 | * | 4/2002 | Brown et al. | 704/251 |

* cited by examiner

*Primary Examiner*—Susan McFadden
(74) *Attorney, Agent, or Firm*—Marger Johnson & McCollom, PC

(57) ABSTRACT

A method and system for utilizing multiple speech recognizers. The speech system includes a port through which an input audio stream may be received, at least two recognizers that may convert the input stream to text or commands, and a combiner able to combine lists of possible results from each recognizer into a combined list. The method includes receiving an input audio stream, routing the stream to one or more recognizers, receiving a list of possible results from each of the recognizers, combining the lists into a combined list and returning at least a subset of the list to the application.

29 Claims, 2 Drawing Sheets

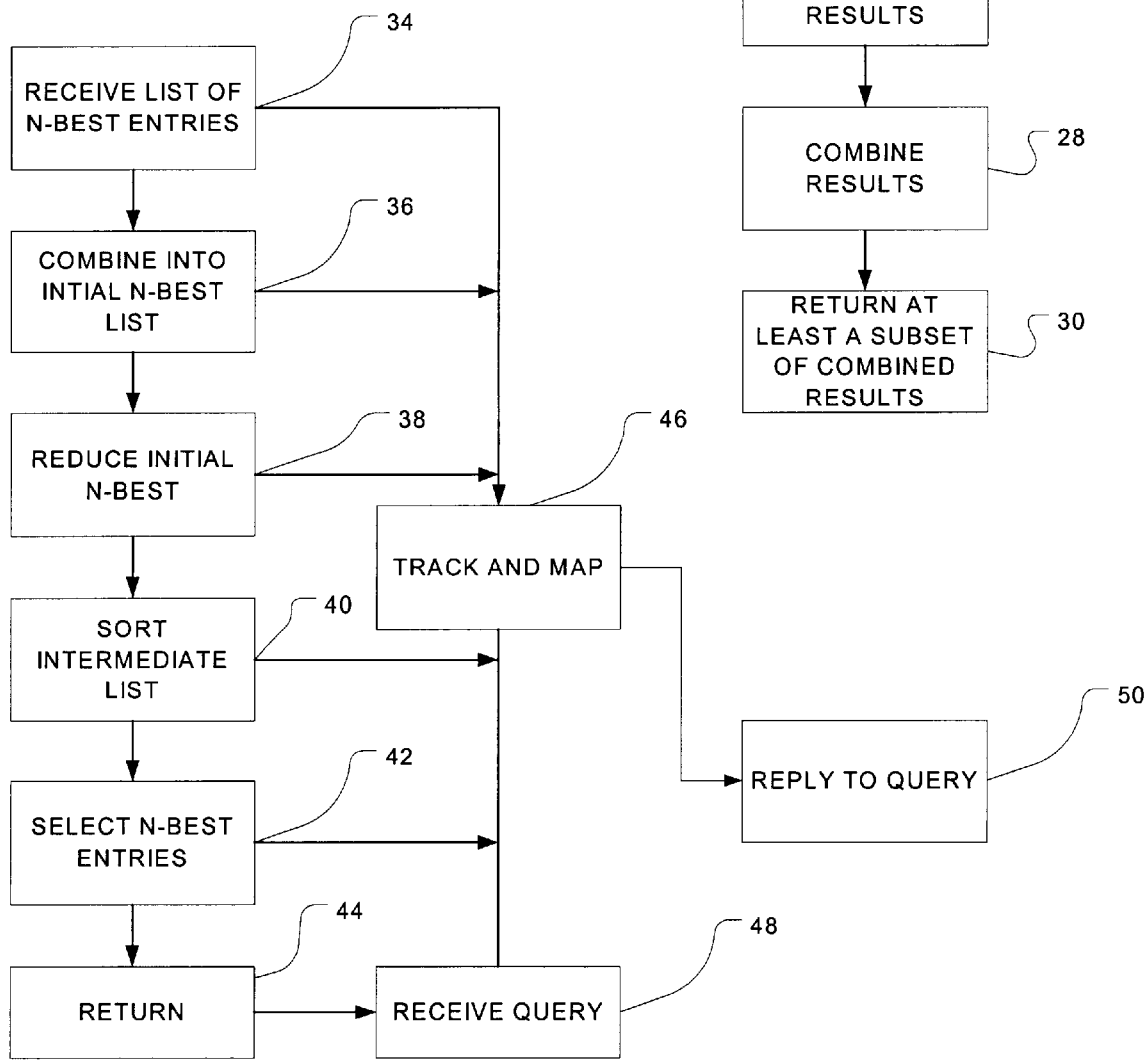

COMBINING N-BEST LISTS FROM MULTIPLE SPEECH RECOGNIZERS

BACKGROUND

1. Field

This disclosure relates to speech recognition systems, more particularly to methods to combine the N-best lists from multiple recognizers.

2. Background

Speech recognizers are those components used in speech recognition systems that perform the actual conversion from the incoming audio stream to text or commands. The recognizer uses algorithms to match what the user says to elements in a speech model. The recognizer then returns text corresponding to user's speech to the application utilizing the speech recognition. In one example, the algorithms are run on a digital signal processor. However, even with powerful processors and detailed speech models, errors still occur. Word recognition rates are generally better than 90%, but failures occur, especially over sequences of words.

Because of uncertainties in the recognition process, the speech recognizer may return several possible text results and allow the application that requested the recognition to select the most appropriate result based on knowledge it possesses regarding the user, the task, the context or other factors. Many speech recognizers support this concept of N-best recognition. The recognizer returns a list of elements that the user might have said, typically accompanied by a score of how confident the recognizer is of each potential match. This list will be referred to here as an N-best list. The application software then decides which entry in the N-best list to use.

Current speech recognition applications use only a single recognizer. However, many speech recognition applications may benefit from the use of several different recognizers. Different recognizers from different manufacturers perform differently even if targeted at the same market. This is due to the use of different algorithms to perform the speech recognition and different training data used to create speech models used by the recognizers. If multiple recognizers are used concurrently, several different N-best lists may be returned to the application. Recognition accuracy could be degraded if the N-best list selected is from a recognizer with poor performance in a particular situation.

Therefore, it would seem useful to have a process for selecting which recognizers should process an audio stream and one for combining N-best lists from different recognizers into one N-best list prior to the list being returned to the application.

SUMMARY

One aspect of the disclosure is a speech recognition system. The system includes a port for receiving an input audio stream and one or more recognizers operable to convert the input audio stream from speech to text or commands. The system also includes a combiner operable to combine lists of possible results produced by each recognizer into a combined list. Some subset of the combined list is then sent back to the application, allowing the application to select the desired conversion result.

Another aspect of the disclosure is a method to utilize multiple speech recognizers. An input audio stream is routed to the enabled recognizers. The method of selecting the enabled recognizers is discussed below. A combiner receives a list of possible results from each of the enabled recognizers and combines the lists into a combined list and then returns a subset of that list to the application.

Another aspect of the disclosure is a method of combining N-best lists from multiple speech recognizers. A combiner receives an N-best list from each enabled speech recognizer and combines the entries in each list into an initial N-best list. The N-best list is then potentially reduced in size and sorted according to at least one sorting criteria. A subset of entries in the resulting sorted N-best list is then returned to the application.

BRIEF DESCRIPTION OF THE DRAWINGS

The invention may be best understood by reading the disclosure with reference to the drawings, wherein:

FIG. 3 shows a flowchart of one embodiment of a method for utilizing multiple speech recognizers, in accordance with the invention.

FIG. 4 shows a flowchart of one embodiment of a method for combining N-best lists from multiple recognizers, in accordance with the invention.

DETAILED DESCRIPTION OF THE EMBODIMENTS

Figure 1:
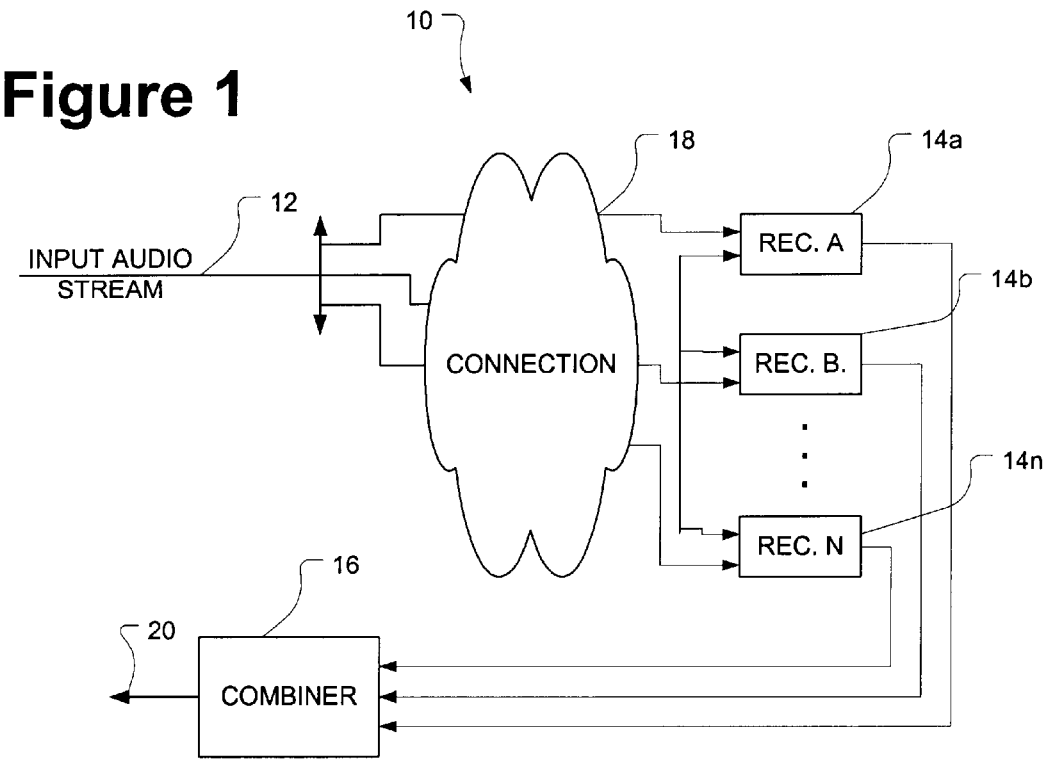
FIG. 1 shows one embodiment of a speech recognition system employing multiple recognizers, in accordance with the invention.

FIG. 1 shows one embodiment of a speech recognition system employing multiple recognizers, in accordance with the invention. The system 10 includes a port 12 through which an input audio stream is received. For example, if the application provides a voice interface for a user to access e-mail, schedules, etc. over a phone, the port may be a telephone handset. Similarly, for dictation applications, the port may be a microphone on a computing device, such as a personal computer or handheld device. Note that there may be a variety of communication networks and interfaces between the port and the recognizers, including processes to convert the audio from analog to various digital forms, intermediate storage and the like. The invention is in no way limited by details of the port or the paths that the audio, in analog or digital form, may travel.

The input audio stream is then routed through a connection to the enabled recognizers. Which recognizers are enabled is detailed below. As shown in FIG. 1, there are several recognizers, 14a, 14b and 14n. Note that the use of the letter 'n' is not to indicate that there are fourteen recognizers ('n' is the fourteenth letter of the alphabet), but to indicate that there are 'n' recognizers, with the actual value of 'n' left up to the system designers.

The connection 18 may be any kind of connection. For example, the application requesting speech recognition may reside on the same device as the recognition system 10. In this instance, the connection may be through a communication bus on the device. Alternatively, the requesting application may be at one node in a network and the speech recognition system 10 at another node. In this example, the connection 18 would be a network, such as a local area network (LAN) or a wide area network (WAN), and may have wired or wireless network interfaces. No limitation to any particular kind of connection is intended.

The speech recognizers may be partitioned across a network as in a distributed speech recognition system. In this case, the recognizers 14a–14n may process raw audio data or a more compact form generated by the front-end speech recognition processes that reside across the network 18. In the following discussions, we refer to the stream of data that the speech recognizers process as the "input stream" or "input audio stream" regardless if it is raw audio data or an intermediate form that may be generated by a distributed speech recognizer or any other form of compression. The invention is in no way limited by the specific architecture of the recognizers.

The recognizers 14a–14n are operable to receive the routed input stream. The recognizers convert the speech contained within to text or commands used in the requesting application. As mentioned previously, different recognizers offer different performance depending upon several factors. Two recognizers from the same manufacturer may be targeted to different markets, for example. One recognizer from a given manufacturer may be targeted to the command and control functions, and will have high accuracy in one or two word phrases predetermined to be commands in the system. Another recognizer may be targeted to the dictation market and will have a much larger vocabulary. However, that particular recognizer may not have any mechanisms to allow it to handle speech recognition tasks over a noisy connection, such as a cell phone. The variation of recognizer combinations is almost limitless and the actual configuration selected is up to the system designers.

However, it is this combination of various recognizers that can lead to inaccurate or otherwise less than desirable results. A robust speech recognition system may have many different types of recognizers to handle different types of situations. Combining the results from the different recognizers must be handled carefully to avoid any problems with the resulting converted speech stream returned to the application.

The combiner 16 handles this combination task. It receives results back from each recognizer to which the input stream was routed. Typically, these results will be in the form of lists of possible results for a given input. Generally, the combiner will receive at least one set of results that is an N-best list. Alternatively, the combiner will produce the combined list in the form of an N-best list. This task of either receiving an N-best list or producing an N-best list will be referred to processing an N-best list. The combiner gathers all of these lists together and coalesces them into a combined list and returns at least a subset of the combined list to the requesting application via output stream 20.

A flowchart of one embodiment of a method of utilizing multiple speech recognizers is shown in FIG. 3. At 22 the input stream is received. At 24 the stream is routed to one or more selected recognizers. In some situations, the speech recognition system may not route the input stream to all of the recognizers available. For example, the incoming stream may be at a point in the dialogue with the system that is beyond command and control. The speech recognition system may therefore not send the incoming stream to the recognizers that have been identified by the system as being only for command and control. Other types of cues may also be available to the system allowing it to route the stream to a subset of recognizers.

After the input stream has been routed to the selected recognizers, a result is received from each recognizer at 26. This result will be referred to as individual result sets, even if there are multiple terms returned from each recognizer. This will assist in differentiating the results obtained from each recognizer from the combined result, discussed in more detail later. For example, in one embodiment, the individual result returned from each recognizer is actually a list of multiple entries.

Note that individual results from recognizers that do not employ a conventional N-best interface may also be employed. Throughout this discussion single entry results will be treated as a form of an N-best interface with N equal to one. For example, a recognizer may be used that returns only a single result. It may return a single result only because the recognizer uses conventional N-best format, but only had one result. Alternatively, the recognizer may not use the conventional N-best format at all, but only return a single result. As used here, the term 'N-best list' will include both of these results. The terms 'dynamic length N-best list' or 'N-best list of dynamic length' will be used to indicate conventional N-best result sets which may contain multiple entries.

These individual result sets are then coalesced into a combined list at 28. Several options exist for the specific mechanisms used to combine the lists as will be discussed in more detail further. Finally, at least a subset of the combined list will be returned to the requesting application at 30. In some instances, all of the individual results may be returned, such as where there are only five possible results and the requesting application has requested five or more results. In other instances only a subset of the results may be returned. Using the same example above, where the requesting application has requested five results, there may be a total of twelve results from the enabled recognizers, so only five will be sent. Additionally, the combined list returned to the application may be truncated based on other criteria. This is discussed below.

In one embodiment, the combination of results is based upon an N-best approach. The term 'N-best' refers to a 'top' number of results, typically those that have the highest confidence values. In many speech recognition systems, results returned from recognizers include a confidence value that indicates how the recognizer views a particular result statistically. For example, if a list of possible results is returned with confidence values ranging from 99% to 78%, and N is equal to three, the results will be sorted by confidence value and the top three will be the N-best list returned to the application.

Note that while we discuss confidence values as being expressed as percentages, different systems may use different mechanisms, different scales and ranges. We discuss some implications of this below. Other types of utility metrics may be used, and some may be used in those embodiments that do not follow the N-best format, as discussed above.

Many different alternatives exist for combining the various results into a combined result, as these terms are defined above. A combination may be a simple concatenation, where each result is just added to a list. Combination may be done by either sorting only, or by sorting and reducing, or only by reducing, the various results. An embodiment of a method to combine results from multiple recognizers is shown in flowchart form in FIG. 4. The N-best lists from each recognizer are received at 34. This is analogous to receiving the lists at 26 in FIG. 3. The process after 34 in FIG. 4 is analogous to combining the lists at 28 in FIG. 3. The individual N-best lists from each recognizer are combined into an initial N-best list at 36. This list contains all of the N-best entries provided from each recognizer to which the input stream was routed.

At 38, the initial N-best list size is reduced. For example, redundant entries could be removed. For example, recognizer A and recognizer B could both have returned the word "blue" for a given input. The combiner will only use one of these, and can eliminate the other.

In some instances, where confidence values are used, the associated confidence value with the term 'blue' may be increased based upon the redundancy. This is similar to a voting scheme, where the recognizers 'vote' on the most accurate result. If more recognizers return a given result, the combiner may be more confident of its value. In the case of redundant entries, the confidence value of the version of the entry that is retained may be increased to reflect the number of recognizers that returned that result. An example of this is discussed in Barry, T.; et al., "The simultaneous use of three machine speech recognition systems to increase recognition accuracy," Aerospace and Electronics Conference, 1994. NAECON 1994, Proceedings of the IEEE 1994 National Page(s): 667–671 vol.2.

In whatever manner the initial list size is reduced, the N-best list is sorted at 40. The sort is performed according to at least one sorting criteria. Sorting criteria will be discussed in more detail later. At 42, the top N entries will be selected. Again, if N is five, the top five entries in the list are selected and returned to the requesting application. The combiner may not return a list with N entries if confidence values for the entries in the combined list are below a certain threshold.

The top of the list is determined by the sorting criteria used. As discussed above, the N-best list may be accompanied by confidence values. The confidence values may be used as one of the sorting criteria. Different recognizers may use different formats for their confidence values. One manufacturer may use a percentage as indicated above. Another may use a rating system, where a given rating equals a certain range of accuracy. In this instance, where the recognizers have different confidence values, the confidence values in the results may have to be normalized to a uniform format prior to the sort being performed.

Another sorting criteria that may be used, either in conjunction with the confidence values, or by itself, is performance values associated with a given recognizer. The performance value can be determined based upon several factors. For example, a user identity may provide information as to the gender of the user, and there may be recognizers that perform differently for women's voices and men's voices. Other characteristics of the user may be available as part of the user identity in the system, including native language, region of the country, history of prior use, etc.

Another basis for performance values may lie in the dialog state of the interaction, as mentioned above. The dialogue state may not be in a navigational command and control subset, as mentioned above, and therefore the performance values for those recognizers specifically developed for this type of speech might be downgraded. Similarly, different recognizers may be optimized for different types of communication channels, such as cellular phones versus landline phones. Different recognizers may also perform better for specific devices, such as cordless phones, traditional phones, speaker phones, or computer phones, as examples.

In addition to having a performance value initially assigned to a given recognizer, the performance value may be dynamically adjusted. For example, a given recognizer could have a performance value assigned based upon the assumption that it is not as accurate with regard to audio received from cellular phones. However, over time, that recognizer may return results that are substantially the same as a recognizer with a high performance for cellular phones. The performance value for the first recognizer may be dynamically adjusted to reflect this.

The performance values may be used to weight information coming from the recognizers, prior to the final sort of the N-best list. For example, recognizers A and B may return first values in each of their respective lists having a confidence level of 99%. However, the performance value of recognizer A may be 90% compared to the performance value for recognizer B of 99%. Therefore, the first value from recognizer A will have an actual confidence value of 0.90*0.99, or 89%, and the first value from recognizer B will have an actual confidence value of 0.99*0.99, or 98%. Note that many algorithms may be applied to normalize confidence levels. This is one example of how confidence levels may be combined, and in no way limits the scope of the invention.

One aspect of this combined list that becomes especially clear when taking into account performance values is the dynamic nature of the sorted N-best list. Even if the performance values are not used, the combination of N-best lists from the different recognizers results in entries from each of the N-best lists being shifted and intermixed with N-best lists from other recognizers. This can be problematic when a query is received from the application about a particular entry in the sorted N-best list.

To overcome this problem, the combiner can act as a proxy for the various recognizers. An example of this is shown in FIG. 3. As the initial N-best lists are combined, reduced and sorted into a combined N-best list, the combiner can track the origin of the entries. In this manner, if a query is received about a specific entry or a specific recognizer, the answer can be made available. The information to fulfill the query may be obtained from an individual recognizer or from information cached by the combiner during the combination process. An example of a piece of information that the combiner is likely to cache is the confidence value. Other information that is not used in forming the combined N-Best list, e.g. natural language interpretations or in/out-of-vocabulary confidence values, would likely be obtained from the recognizer.

Figure 2:
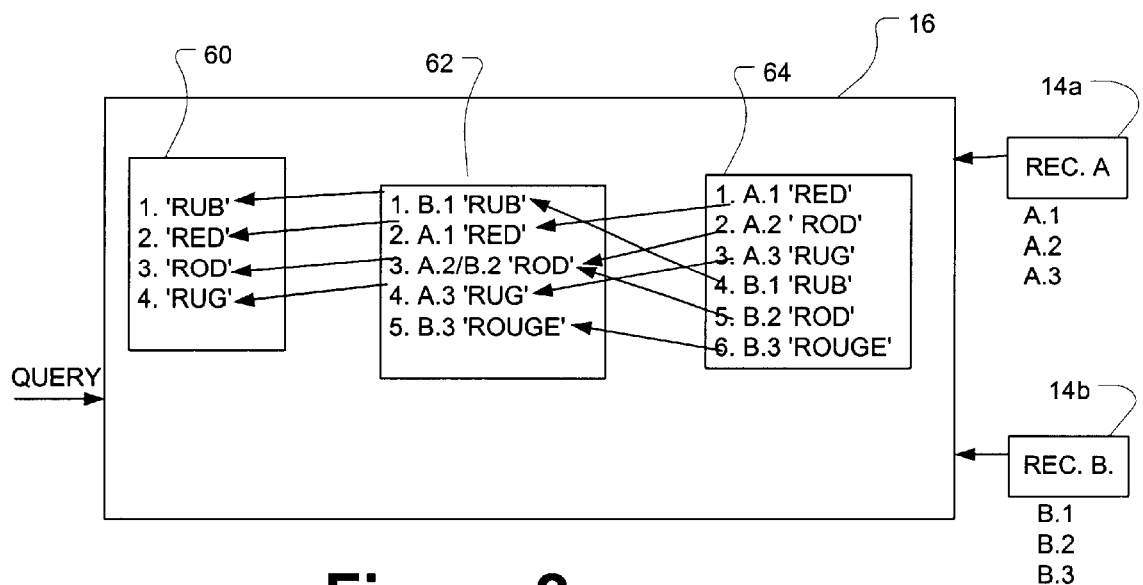
FIG. 2 shows a block diagram of a combiner acting as a proxy for multiple speech recognizers, in accordance with the invention.

The combiner typically will not actually maintain copies of each of the recognizers' N-best lists Instead, the combiner will have an index or map that allows it to point back to the N-best list on a given recognizer and bring that answer 'forward' to the requesting application. A block diagram of one embodiment of this situation is shown in FIG. 2.

The combiner presents an N-best list of entries, where N is 4. The N-best list returned to the application is a list of four words, with no indication from where those words came. However, during the process of combining the lists, the combiner tracks and remembers the order from the recognizers, as shown in the initial list 64. As the initial list 64 was reduced to intermediate list 62 and finally presented, the information as to the origin of the results is maintained. If a query is received desiring that information, the combiner can act as a proxy, go back and fetch that information from the recognizers 14*a* and 14*b* and return it to the requesting application. Note that instances where the same term has been provided by multiple recognizers, the system may return information from an individual recognizer, such as the one with the highest confidence rating, or may act as an intelligent proxy by consolidating information from multiple recognizers to satisfy the query.

In this manner, a method and system are provided to intelligently combine results from multiple recognizers. As mentioned above, current speech recognition systems that employ multiple recognizers generally rely on simple voting schemes.

Note that though this disclosure has discussed the combiner returning a full N-Best list to the application, current systems don't return a full N-best list to the application, rather they provide APIs whereby the application can request specific elements from the list ("give me the 3$^{rd}$ element on the list"). Additionally most systems provide an API for the application to determine how many entries are available on the N-best list. The application design determines how far down the N-best list the application fetches. The invention disclosed here is in no way limited to systems which provide the entire N-best to the application at one time, nor is it limited to the current practice of the application querying the recognizer for individual entries.

Implementation of this invention in existing speech systems may take the form of a software upgrade. Generally, the software would be available on an article such as a floppy diskette, CD-ROM or other optical or magnetic media. The article would then contain code that, when executed, would perform the methods of the invention.

Although there has been described to this point a particular embodiments for a speech recognition system and method for utilizing multiple speech recognizers, it is not intended that such specific references be considered as limitations upon the scope of this invention except in-so-far as set forth in the following claims.

What is claimed is:

1. A method for utilizing multiple speech recognizers, the method comprising:
   a) receiving an input stream;
   b) routing the input stream to one or more recognizers;
   c) receiving individual result sets from each of the recognizers, wherein at least one individual result set comprises an N-best list of dynamic length;
   d) combining the individual results into a combined list; and
   e) returning at least a subset of the combined list to the application.

2. The method of claim 1, wherein the subset of the combined list further comprises an N-best list of dynamic length.

3. The method of claim 1, wherein the individual result sets from the recognizers include at least one associated utility metric.

4. The method of claim 3, where the utility metric is comprised of confidence values for the individual results.

5. The method of claim 1, wherein the method further comprises normalizing the individual results prior to combining the individual results into a combined list.

6. The method of claim 5, the method further comprising weighting the individual results from each recognizer with a performance value associated with each recognizer.

7. The method of claim 6, wherein the performance value associated with each recognizer varies based upon at least one the group comprising: a user identity, a user gender, a user ethnicity, a user native language, contextual information, an active dialog state of the application, a communication channel used, and a communication device used.

8. The method of claim 6, wherein the performance value associated with each recognizer is updated dynamically.

9. The method of claim 1, wherein the individual results comprise N-best lists from the recognizers.

10. The method of claim 1, the method further comprising analyzing redundant results in the combined list for results that are substantially the same and raising a confidence level for those results.

11. The method of claim 1, wherein the method further comprises reducing the size of the combined list.

12. The method of claim 1, wherein the method further comprises tracking and mapping locations of each entry in the combined list from the individual results.

13. The method of claim 1, wherein the method further comprises:
   a) receiving a query specific to an entry in the combined list after returning at least a subset of the combined list to the application,
   b) determining a location for the entry in the individual results received from the recognizers; and
   c) satisfying the query.

14. The method of claim 1, wherein at least one individual results sets further comprises an N-best list of dynamic length.

15. A method for combining N-best lists from multiple recognizers, the method comprising:
   a) receiving an N-best list from one or more recognizers
   b) combining all N-best entries from the N-best lists received from the recognizers into an initial N-best list;
   c) reducing the N-best list size, resulting in an intermediate N-best;
   d) sorting the intermediate N-best list according to at least one sorting criteria, resulting in a sorted N-best list; and
   e) selecting a subset of entries from the sorted N-best list.

16. The method of claim 15, wherein the N-best lists have accompanying confidence levels for each entry in each N-best list.

17. The method of claim 16, wherein the method further comprises normalizing the confidence levels from each N-best list.

18. A speech recognition system, comprising:
   a) a port operable to receive an input audio stream;
   b) at least two recognizers operable to convert the input stream into a converted stream and to provide results;
   c) a combiner operable to combine the results from each of the recognizers into a combined result and to send at least a subset of the combined result to the application, wherein the combiner processes an N-best list.

19. The speech recognition system of claim 18, wherein the port further comprises a telephone receiver.

20. The speech recognition system of claim 18, wherein the port further comprises a microphone connected to a computing device.

21. The speech recognition system of claim 18, wherein the port connects to the recognizers by a network.

22. The speech recognition system of claim 18, wherein the combiner is further operable to act as a proxy for the recognizers.

23. An article containing machine-readable code that, when executed, causes the machine to:
   a) receive an input stream;
   b) route the input stream to one or more recognizers;
   c) receive individual result sets from each of the recognizers, wherein at least one individual result set is further comprises an N-best list of dynamic length;
   d) combine the individual result sets into a combined list; and
   e) return at least a subset of the combined list to the application.

24. The article of claim 23, wherein the code, when executed, further causes the machine to normalize the individual result sets received from the recognizers prior to combining the individual result sets into a combined list.

25. The article of claim 23, wherein the code, when executed, further causes the machine to:
   a) combine all individual result sets from the recognizers into an initial N-best list;
   b) reduce the initial N-best list size, resulting in an intermediate N-best list;
   c) sort the intermediate N-best list according to at least one sorting criteria, resulting in a sorted N-best list; and
   d) select a predetermined number of entries from the sorted N-best list.

26. The article of claim 25, the code, when executed, further causing the machine to weight the N-best entries from each recognizer with a performance value associated with each recognizer.

27. A method for utilizing multiple speech recognizers, the method comprising:
   a) receiving an input stream;
   b) routing the input stream to one or more recognizers;
   c) receiving individual result sets from each of the recognizers;
   d) combining the individual results into a combined list; and
   e) returning at least a subset of the combined list to the application, wherein the subset further comprises an N-best list of dynamic length.

28. An article containing machine-readable code that, when executed, causes the machine to:
   a) receive an input stream;
   b) route the input stream to one or more recognizers;
   c) receive individual result sets from each of the recognizers;
   d) combine the individual result sets into a combined list; and
   e) return at least a subset of the combined list to the application, wherein the subset further comprises an N-best list of dynamic length.

29. The article of claim 28, wherein at least one individual result sets further comprises an N-best list of dynamic length.

* * * * *